United States Patent [19]

Little

[11] Patent Number: 4,785,420

[45] Date of Patent: Nov. 15, 1988

[54] AUDIO/TELEPHONE COMMUNICATION SYSTEM FOR VERBALLY HANDICAPPED

[75] Inventor: Paul D. Little, Kilgore, Tex.

[73] Assignee: Joyce Communications Systems, Inc., Longview, Tex.

[21] Appl. No.: 849,692

[22] Filed: Apr. 9, 1986

[51] Int. Cl.⁴ ............................................. G10L 5/00
[52] U.S. Cl. .................................. 364/513.5; 379/52
[58] Field of Search ................ 364/513.5; 381/51–53; 379/37–89

[56] References Cited

U.S. PATENT DOCUMENTS

| | | | |
|---|---|---|---|
| 4,189,779 | 2/1980 | Brautingham | 179/1 |
| 4,215,240 | 7/1980 | Ostrowski | 179/1 |
| 4,246,443 | 1/1981 | Smith | 179/2 |
| 4,291,198 | 9/1981 | Anderson et al. | 340/711 |
| 4,387,269 | 6/1983 | Hashimoto et al. | 179/1 |
| 4,429,367 | 1/1984 | Ideda | 179/1 |
| 4,489,438 | 12/1984 | Hughes | 381/51 |
| 4,503,288 | 3/1985 | Kessler | 179/2 |
| 4,516,260 | 5/1985 | Breedlove et al. | 179/1 |

Primary Examiner—Emanuel S. Kemeny
Attorney, Agent, or Firm—John R. Kirk, Jr.

[57] ABSTRACT

In one exemplary embodiment, an audio/telephone communication system for verbally handicapped individuals is disclosed that comprises a programmed computer, and a matrix of touch-sensitive contacts carrying an overlay removably attached thereto and symbolically displaying for sensory perception and random selection by an operator each of a plurality of message commands associated with a preselected and prerecorded vocabulary of spoken messages, and in response to the operator selection the contact matrix generating data signals identifying the selected messages and control commands for application to the computer. An expansion memory is interconnected to the computer and has stored therein the preselected command data and digital message data representative of the message vocabulary. A digital to analog converter is provided that receives and responds to the digital message data retrieved by the computer from the memory for regenerating the selected audio messages and applying the regenerated messages to a speaker. An interface circuit establishes direct interconnection between the digital to analog converter and the speaker, and further establishes communication between the computer, the digital to analog converter and a telephone line for interconnecting the system to the telephone line in response to a plurality of computer generated signals.

15 Claims, 9 Drawing Sheets

| | A | B | C | D | E | F |
|---|---|---|---|---|---|---|
| 1 | weather | sun | rain | snow | ice | wind | hot | cold |

| | A | B | C | D | E | F |
|---|---|---|---|---|---|---|
| | weather | Temperature | Time ? | Month ? | Weekend | vacation |
| 1 | sun | 10's | 1 | JAN | SUN | birthday |
| 2 | rain | 20 | 2 | FEB | MON | Anlv. |
| 3 | snow | 30 | 3 | MAR | TUES | valentine |
| 4 | ice | 40 | 4 | APR | WED | Easter |
| 5 | wind | 50 | 5 | MAY | THUR | Halloween |
| 6 | hot | 60 | 6 | JUNE | FRI | Thanksgiving |
| 7 | cold | 70 | 7 | JULY | SAT | Christmas |

| G | H | I | J | K |
|---|---|---|---|---|
| football | love | Joyce | hungry | Bill |
| Pittsburg Steelers | bored | address | thirsty | work |
| Atlanta Falcons | hello | Phone. No. | afraid | telephone |
| Seattle Seahawks | goodbye | talk | tired | Social Security |
| Washington Redskins | yes | Social Security | head | |
| Chicago Bears | no | wait | throat | money |
| Dallas Cowboys | good | question | stomach | food |
| Philadelphia Phillies | bad | understand | tooth | clothes |

|   | L | M | N | O |
|---|---|---|---|---|
|   | David | Steve | bed | city |
|   | ship | ship | shower | garage |
|   | cafeteria |   | shop | girl |
|   | dog |   | hospital | car |
|   | dog |   |   |   |
|   | washer | mail carrier | television | drive |
|   | house | wash | soap | cook |
|   |   | shampoo | eat | breakfast |

FIG. 4E

AUDIO/TELEPHONE COMMUNICATION SYSTEM FOR VERBALLY HANDICAPPED

BACKGROUND OF THE INVENTION

The present invention relates to an audio communication system for non-verbal or verbally handicapped individuals that permit them to communicate with speech and to carry on two-way telephone converations.

There are many persons who suffer from a verbal handicap, either due to disease, a birth defect or as a result of a stroke (aphasic). Further, some persons may also suffer from additional handicaps, such as loss of sight or limited movement of limbs and hands. Such persons, especially aphasics, who may at one time have enjoyed all of their sensory and physical faculties, may still be mentally alert and have some physical movement, but be non-verbal.

For a long time, people have tried to find a solution to this problem, one that would permit the verbally handicapped individual to audibly communicate with others and that would provide them a degree of independence, self-reliance and self-confidence that cannot be achieved otherwise. In many cases, the verbally handicapped must learn sign language or resort to communication by writing. While there are available portable audio systems for the verbally handicapped, there are no systems designed to provide both audio communication between the verbally handicapped person and others and two-way telephone conversations over a standard telephone line.

SUMMARY OF THE INVENTION

The present invention is designed as an operator (the verbally handicapped individual) controlled audio communication system for verbally handicapped individuals that also provides two-way telephone communication over a telephone line. The system utilizes a programmed computer, such as a microcomputer, an expanded memory connected to the computer and having stored therein digital message data and control command data representing a preselected vocabulary of spoken messages and a plurality of control commands for the system. A matrix of touch sensitive contacts is connected to the computer and has an overlay that symbolically displays for sensory perception and random selection by the operator each of the plurality of control commands and the message commands in the vocabulary, and, in response to operator selection, generates data signals identifying the selected message and control commands for application to the computer.

A digital-to-analog (D/A) converter is connected to the computer and is responsive to the digital message data retrieved by the computer from the memory for reproducing audio frequency speech representing the operator selected messages and dual tone multi-frequency signals (DTMF) representing selected telephone numbers as part of the control commands. A speaker is provided for audibly broadcasting the reproduced audio message. An interface circuit is provided for establishing direct interconnection between the D/A converter and the speaker, and for establishing communication between the computer, the D/A converter and the telephone line for interconnecting the system to the telephone line and permitting two-way telephone communication thereon to transmit the reproduced audio messages and receive third-party generated telephone message in response to telephone connect signals received from the computer.

The computer is programmed to receive the control and message commands from the matrix of touch sensitive contacts and in response thereto interrogating the expansion memory to locate and retrieve the digital message data stored therein and in response thereto applying said digital message data to the D/A convertor reproducing the selected audio message, and in response to the received command data generating telephone connect signals applied to the interface circuit.

The system may further include an audio recorder to record the regenerated audio messages and two-way telephone conversations, the interface circuit further establishing communication between the computer, the D/A converter, the telephone line and the recorder for recording the audio messages and two-way telephone conversation in response to a record signal received from the computer. The computer is further programmed to receive data signals from the matrix input means representing a selected control command and in response thereto generating record signals applied to the interface circuit. The system may further include alarm and/or accessory equipment, such as security lights, medical emergency equipment, etc., that are connected to the interface circuit and operable in response to an alarm signal received from the programmed computer.

Accordingly, one primary feature of the present invention is to provide a system that provides both a means of audio communication and two-way telephone communication for the verbally handicapped individual.

Another feature of the present invention is to provide a matrix of touch sensitive contacts that carries an overlay symbolically displaying for sensory perception and random selection a plurality of control and message commands for the communication system.

Still another feature of the present invention is to provide memory storage of digital data representative of prerecorded audio messages that can comprise words, phrases and sentences.

Yet another feature of the present invention is to provide an interface circuit that establishes direct communication between a D/A converter that regenerates the selected audio message from the digital message data representative of the desired message and a speaker for audible broadcast of the selected message, and that further establishes communication between the computer, the D/A converter and the telephone line for interconnecting the system to the telephone line for two-way communication thereon in response to signals from the programmed computer.

BRIEF DESCRIPTION OF THE DRAWINGS

In order that the manner in which the above-recited advantages and features of the invention are attained and can be understood in detail, a more particular description of the invention may be had by reference to specific embodiments thereof which are illustrated in the accompanying drawings, which drawings form a part of this specification.

In the drawings:

FIG. 4A is an enlarged fragmentary graphical representation of a first portion of the overlay shown in FIG. 3.

FIG. 4C is an enlarged fragmentary graphical representation of a third portion of the overlay shown in FIG. 3.

FIG. 4E is an enlarged fragmentary graphical representation of a fifth portion of the overlay shown in FIG. 3.

DETAILED DESCRIPTION OF THE PREFERRED EMBODIMENTS

Figure 1:
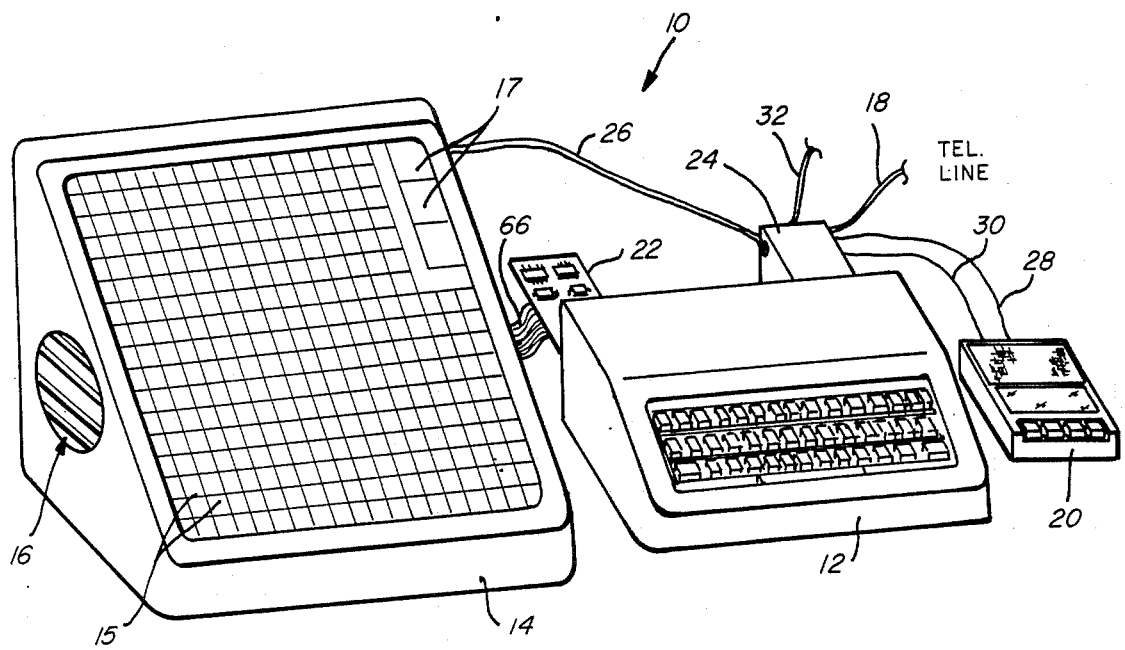
FIG. 1 is a pictorial view of the system components of the audio/telephone communication system for verbally handicapped individuals.
Figure 2:
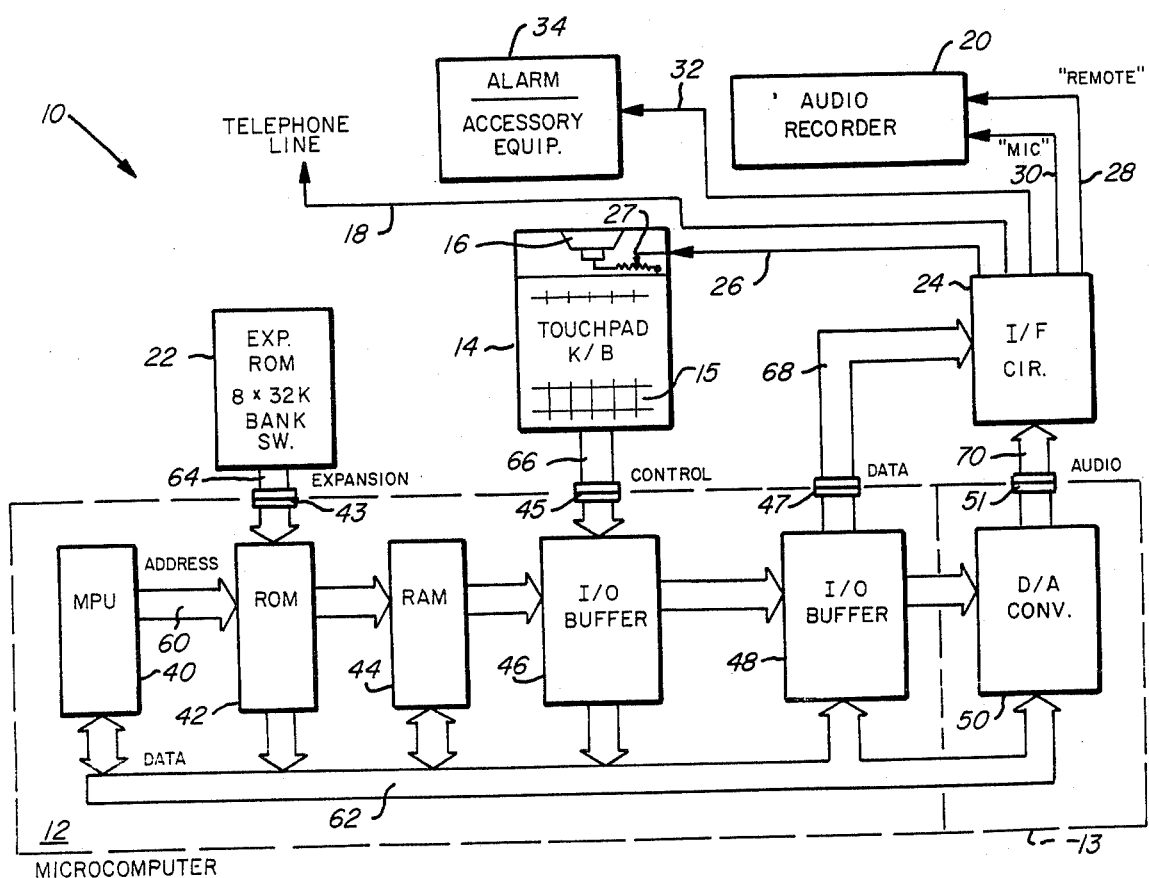
FIG. 2 is a block-diagram of the audio/telephone communication system.
Figure 3:
FIG. 3 is a overall graphical representation of the overlay that symbolically displays for sensory perception and random selection the control and message commands that can be input from the matrix of touch-sensitive contacts.

Referring now to FIGS. 1, 2 and 3, the audio/telephone communication system for verbally handicapped individuals is shown. A programmed microcomputer 12 is the heart of the system, and may be any conventional microcomputer, such as one of the many "personal" computers presently available. As shown in FIG. 2, the system requires a digital-to-analog (D/A) converter, 50, which may be a separate unit 13 (not shown in FIG. 1), or it may be included in the microcomputer 12, as in some conventional "personal" computers. While microcomputer 12 and the D/A converter 50 may be separate units, it has been found convenient to use a Commodore 64 personal computer as the microcomputer 12 because it includes the audio frequency D/A converter 50. Accordingly, while to one skilled in the art microcomputer 12 may be any conventional programmable microcomputer and the computer and D/A converter 50 may be separate units, for simplicity herein, reference will be made to microcomputer 12 and the D/A converter 50 as separate circuits, although they are packaged together in the Commodore 64 computer.

Again, for simplicity, reference to the external interface ports to computer 12 of the system 10 will use the Commodore 64 computer port identification, since it will be readily apparent to one skilled in the art how to interchange the external peripheral equipment in the system 10 based on the hereinafter described functions. The microcomputer 12 contains conventional circuitry shown in block diagram form in FIG. 2. The microprocessor unit (MPU) 40 addresses, via an Address Bus 60, a Read Only Memory (ROM) 42, a Random Access Memory (RAM) 44, a first Input/Output Buffer 46, a second Input/Output Buffer 48, and in the case of the Commodore 64 computer hereinabove mentioned, a D/A converter 50. The MPU 40 also sends and receives data from the other associated circuits via a bi-directional Data Bus 62. In all references hereafter to computer 12, the above described circuitry will be assumed to be included within the term "computer."

Computer 12 is interconnected to a matrix of touch sensitive contacts, such as the Power Pad device manufactured by Chalk Board, Atlanta, Georgia, by a ribbon cable 66 through the computer "control" port 45. The "touch sensitive" keyboard or input means 14 has an overlay 14' grid for symbolically displaying for sensory perception and random selection by the operator each of a plurality of control commands 17, special message commands 19, and emergency commands 21 (See FIG. 3), and a plurality of message commands 15 representing a preselected vocabulary of spoken messages. The Power pad unit above described is a 120×120 matrix of touch-sensitive contacts (14,400 contacts) each separated by about 0.10 inches.

In practice, for the verbally handicapped, the overlay 14' for the display of the message and control commands utilizes a 15×17 matrix of "squares" that are approximately 0.6×0.7 inches and provide 255 message and control "squares." Of course, any other matrix of touch-sensitive contacts could be utilized. The keyboard input means 14 is a free-standing unit and includes a built-in speaker 16 for audio broadcast of the audio messages and telephone conversations as will hereinafter be described in greater detail.

Because of the increased memory required for storage of the preselected audio messages, a 256K ROM board 22, connected to the expansion port 43 of the computer, is necessary and will be described in greater detail later. An interface circuit 24 is interconnected to the computer through cable 68 (FIG. 2) and the D/A converter 50 through cable 70 (FIG. 2) by utilizing the "data" and "audio" ports 47 and 51, respectively. The interface circuit 24 is connected to speaker 16 by a cable 26, to a standard telephone line 18 (via a standard modular telephone plug) and to a recording device 20 by means of cables 28 and 30. Interface circuit 24 may also be connected to selected security/alarm or other accessory equipment 34 (not shown in FIG. 1) via cable 32.

The "touch sensitive" contact matrix 14 and overlay 14' together function as an input means to the computer 12, and by the grid "squares" 15, 17, 19 and 21 symbolically displays an identification key for each preselected audio message and control command. For the verbally handicapped individual who still has good visual acuity, standard REBUS symbols may be utilized, supplemented by selected symbols and/or words that may have particular meaning for the verbally handicapped individual. The REBUS symbols are international symbols used in teaching handicapped persons and referenced in the "Standard REBUS Glossary," Charlotte & Davie (American Guidance Services). Accordingly, it is apparent that the symbol display overlay 14' can be "customized" for each individual to permit them maximum latitude to express themselves and their personality. However, for the verbally handicapped who have also lost their sense of sight, the REBUS symbols can be replaced by a graphical layout of Braille symbols that correspond to the desired audio message.

Accordingly, the "squares" 15, 17, 19 and 21 of the matrix overlay 14' will symbolically display for sensory perception by the operator (verbally handicapped individual) each of the preselected vocabulary of audio messages stored in the computer, as well as a plurality of preselected control commands that control the system. The overlay grid display 14' of each of the preselected audio messages in the vocabulary and the control commands may be randomly selected by the operator, and when the selected "square" 15, 17, 19 or 21 is touched, a data signal is generated by the input contact matrix 14 identifying the selected audio message or control command and is applied to computer 12 through cable 66.

Referring now to FIG. 3, the overall layout of the graphical representation of the overlay 14' displaying the "touch sensitive" squares 15, 17, 19 and 21 is shown. In the preferred embodiment, the three vertical columns of squares on the right side of the matrix 14 are dedicated to the operator control commands, including emergency commands to the police, fire department and ambulance (21), system control commands (17) and special message commands (19). The selected special telephone messages (19) may be specific greetings tailored for the person to be called, such as identified family members, close friends and associates, and other professional people, for example, doctor, dentist, accountant, lawyer, etc. The operator control commands (17) are displayed as DIAL, SPEAK, HANG UP, ANSWER (all for controlling audio communications over the telephone line), MESSAGE and MESSAGE "off" (for controlling the operation of the audio recording means 20), and the previously mentioned POLICE, FIRE and AMBULANCE emergency messages (21).

The remaining symbol message squares 15 to the right of the operator control command squares 17, 19 and 21 are designed to cover a wide vocabulary of words and phrases. The squares 15 use primarily REBUS symbols and words for indicating words and-/or phrases. However, other symbols and/or words that can have particular meaning to the operator may be selected, or if the individual has good visual acuity, certain words or names of places or things may be used. As may be seen in FIG. 3A, the top horizontal line contains symbols 15 that represent different weather conditions and the four seasons. The second and third lines are devoted primarily to various numbers that can be used to tell temperature, time, measurement and dollars. The next line carries symbols representative of the various calendar months and for a year. The fifth line carries symbols for the days of the week, and representing "yesterday," "today" and "tomorrow." The sixth line has symbols that signify major holidays during the year, "day," "night," and "early" or "late." The next line carries a symbol of a football and the names of several professional football teams that the individual and/or the individual's family is interested in or knowledgeable about. Other sports teams may be listed as well. In addition, other selected geographical locations may be used. In the eighth line are found primarily REBUS symbols for various words ranging from feelings and emotions to descriptive terms. In the other lines, additional REBUS symbols are utilized to "round out" the vocabulary of preselected audio words and/or messages. Of course, other special symbols and words can be selected and used to expand the particular vocabulary of the verbally handicapped individual. The "squares" and the symbols shown therein are shown in greater detail in FIGS. 4A-4F, and will hereinafter be described in greater detail.

Referring to FIG. 2, the operation of the audio/telephone communication system will be explained in detail. In the personal computer utilized as the microcomputer 12 of the system 10, the internal ROM 42 has a capacity of 32K. As hereinabove described, the 32K ROM 42 does not have the capacity to store the vocabulary necessary for the system, and therefore, additional memory capacity in the form of an expansion ROM board 22 is necessary. The ROM board 22 contains eight 32K erasable programmable read only memory (EPROM) chips and a bank select register that can provide up to 256K of ROM capacity in increments or "banks" of 8K. A bank switching EPROM cartridge board, manufactured by the Jason-Ranheim Company, San Jose, Calif., identified as the PCC-8, and utilizing eight 27256 EPROMs was found to be an excellent expansion ROM circuit for use with computer 12. It further has the capability of being switched completely out of the system to utilize 8K of the computer RAM 44. The Jason-Ranheim PCC-8 board also includes a software program for use with the expansion ROM cartridge that enables the computer to download and run the operating program.

The input means comprising the matrix of touch-sensitive contacts 14 has hereinabove been described in detail and will not be further discussed. However, the overlay graphics 14' for use with the matrix contacts 14 will be described in greater detail later. The interface circuit 24 is shown in block diagram form in FIG. 2, but will be hereinafter further described in detail.

In producing an audio/telephone communication system 10, the first step is the creation of the message symbols 15, 17, 19 and 21 to be used in the matrix "squares" of the overlay 14', and to select and assign an audio message to each preselected symbol and "square". Then the selected audio messages are recorded and edited on a tape recorder. It is desirable to have a person of the same sex and age record the audio messages to closely match the verbally handicapped individuals former or expected voice characteristics, particularly for aphasics. The tape recorded messages are then converted to digital signals utilizing an analog-to-digital converter device (not shown), and then, using appropriate software, the digitized messages are loaded into the computer RAM 44. When the RAM 44 is full, the software processed "digitized" audio message vocabulary is dumped from the RAM 44 to a floppy disk file for temporary storage using a conventional peripheral disk drive (not shown). This process is repeated until all of the audio message vocabulary has been "digitized" and stored on the disk(s). Any suitable software/hardware package for converting the tape recorded audio messages to digital data may be utilized, and the Voice Master speech and music processor package, Version 2.19, for the Commodore 64, manufactured by Covox, Inc., Eugene, Oreg., has been found ideally suited for this purpose. The Covox Voice Master package includes an analog-to-digital converter and a software program for processing and storing the digitized data, representative of the preselected audio messages, in computer 12. The Covox Voice Master program has the ability to digitize and record spoken audio vocabulary messages up to eight seconds in duration. Thus the messages can be single words, phrases or short sentences.

A program designed for the system 10 is then loaded and run in computer 12 to identify the vocabulary messages and assign the messages to a specific "square" on the matrix 14. The data thus generated is also stored on a floppy disk utilizing the external disk drive (not shown). Then the Jason-Ranheim PCC-8 EPROM programming software is loaded and run in the computer 12 utilizing the external disk drive. The various program modules are then loaded one at a time to program each of the EPROMs on the expansion ROM board with the necessary data. The program and data modules in the order in which they are loaded, their function and source are shown below in Table I.

TABLE I

| Program/Data | Function | Program Source |
|---|---|---|
| Download/Run Program | Moves and "runs the operating program to RAM 44 upon power up of the system. | Jason-Ranheim Company |
| Operating System Program | Written in BASIC language, calls the machine language subroutines that execute the program. | Inventor |
| Square Data | Contains the data in a predetermined map that is accessed by the Operating System Program to determine the program response to each "square" 15, 17, 19, and 21 touched on the matrix 14. | |
| Covox Voice Master Program | A machine language program that regenerates audio (speech) from the digitized message data. | Covox, Inc. |
| Power Pad Driver Program | A machine language program that interfaces the I/O Buffer 46 and the "control" port 45 of the system. | Chalk Board |
| Speech Data Move Program | A machine language program that moves message data from the EPROMS on board 22 to RAM 44 for use by the Covox Voice Master software. This program is executed before each message is spoken. | Inventor |
| M/L Move Program | A machine language program that moves the Covox Voice Master, Power Pad Driver and Speech Data Move programs from the ROM board 22 to RAM 44 to facilitate easy access. | Inventor |
| Speech Data | Data generated by the Covox Voice Master program that is a "digital" representation of the audio messages previously tape recorded and stored on the floppy disk is programmed into appropriate EPROMs. | |

The programmed EPROMs are then installed in the computer ROM extension board(s) 22 and the ROM board 22 plugged into the "expansion" port 45 of computer 12, and the system is assembled as shown in FIGS. 1 and 2.

The following table (Table II) contains a list of the inventor generated program variables appearing in the source code and their definitions.

TABLE II

| CONSTANTS | USE |
|---|---|
| BS | Bank Select Register Address (on ROM board) |
| B | Base address of Square Data table |
| SO | Special Function address offset |
| AO | Special Action address offset |
| RV | Regular Word & Pause address offset |
| PO | Phone Number address offset |
| SV | Special Vocabulary address offset |
| SW | Special Word & Pause address offset |
| M | Value of the End of DATA Flag |
| UP | Address of Data Register for Users Port |
| L1,H1 | Address of D/A Frequency 1 out |
| L2,H2 | Address for D/A Frequency 2 out |
| V1,V2 | Waveform control for D/A outputs 1 and 2 |
| TW | Triangular waveform command for D/A |
| OF | Output OFF command for D/A |
| ARRAYS | USE |
| AR(15) | Temporary storage for Word/Pause or Phone Digits From Square Data Table |
| R(9) & C(9) | Row & Column Cross Reference for touch tones |
| H(7) & L(7) | Hi & Low bytes of 16-bit number used to determine the touch tone frequencies |
| VARIABLES | USE |
| IC | Counter for tries to initialize the Power Pad |
| SN | Sense, returned from Power Pad Driver Program |
| X | X coordinate "touched" on the Power Pad |
| Y | Y coordinate "touched" on the Power Pad |
| FO | Flag for "no touch" on last scan of Power Pad |
| H | Horizontal square coordinate |
| V | Vertical square coordinate |
| HH & VV | Used for testing release of "touch" |
| SQ | Square pressed, derived from X & Y |
| AA | Base address for look-up in Square Data Table |
| A | Loop control, added to AA for data address |
| W | Word Number to be "Spoken" |
| P | Pause value expressed in .25 Seconds |
| SC | Special Code, flag for Special Action |
| SS | Storage for last valid Special Action |
| AC | Action Code, determines what Action occurs |
| D | Digit of Phone Number |
| EC | Emergency Command Call Counter |

The following is an assembly listing of the software designed specifically for the audio/telephone communication system 10 for use in the microprocessor 12.

```
1 GOSUB110
5 READ BS,SO,AO,RV,RW,PO,SV,SW,B,M,UP
10 DATA 57343,0,256,512,768,4864,6000,6048,32768,255,56577
20 DIMAR(15),R(9),C(9),H(7),L(7)
30 POKE56579,255:POKEUP,0:REM INITILIZE USERS PORT
40 FORD=0TO9:READ R(D):READC(D):NEXT
45 DATA4,6,1,4,1,5,1,6,2,4,2,5,2,6,3,4,3,5,3,6
50 FORT=1TO7:READH(T):READL(T):NEXTT
55 DATA44,168,49,85,54,150,60,74,77,117,85,152,94,161
60 READL1,H1,V1,L2,H2,V2,TW,OF
65 DATA54272,54273,54276,54279,54280,54283,17,16
100 GOTO200
110 POKE57343,3:SYS36736:POKE57343,32:REM EXECUTE M/L MOVE IN ROM
130 SYS49152:REM INSTALL COVOX WEDGE
140 PRINT"(CLR)(C/DN)(C/DN)(C/DN)CLEAR50(C/DN)(C/DN)(C/DN)(C/LF)(C/LF)(C/LF)(C/L
F)(C/LF)(C/LF)(C/LF)SCREEN1(C/DN)(C/DN)(C/DN)(C/LF)(C/LF)(C/LF)(C/LF)(C/LF)(C/LF
)(C/LF)CONT(HOME)":PRINT ON "SCREEN" -
150 POKE198,3:POKE631,13:POKE632,13:POKE633,13:REM AND POKE K.B. BUFFER -
160 END:REM  TO EXECUTE IMEDIATE COMMANDS PRINTED
```

```
170 POKE57343,2:RETURN:REM SWITCH SQUARE DATA IN
200 IC=IC+1:IFIC=50THENSYS52745:SPEAK63:IC=0
210 SYS52736:REM INITILIZE CIA TO TALK TO POWER PAD
220 SYS52739:REM GET-SENSE FROM POWER PAD
230 SN=PEEK(52750):REM SENSE STORAGE
240 IFSN=0THEN270:REM "TOUCH" SENSED
250 IFSN=1THEN200:REM "NO TOUCH"
260 IFSN=2THENSYS52745:PRINT"SPACE":STOP
270 IC=0:SYS52742:REM GET X & Y COORDINANTS
280 X=PEEK(52749):Y=PEEK(52748):REM PASS DATA FROM M/L TO BASIC
300 IFFO=1THENFO=0:HH=0:VV=0:NN=0:REM FLAG TEST FOR 2 TOUCHES IN A ROW
310 IFX=0ANDY=0THENFO=FO+1:GOTO220:REM SET FLAG FOR LINE 300 TEST
320 H=INT((NOT(X+8)AND127)/7+1):REM COMPUTE HOROZONTAL AXIS (1-17)
330 V=INT(Y/8)+1:REM COMPUTE VERTICAL AXIS (1-15)
340 IFV=VVANDH=HHORV>15ORH>17THEN220:REM TEST FOR TWO CONSECUTIVE "TOUCHES"
350 HH=H:VV=V:REM TWO "TOUCHES" RECEIVED  SET FLAGS FOR "RELEASE TOUCH TEST"
400 SQ=17*(V-1)+H:PRINTSQ:REM COMPUTE SQUARE NUMBER (1-255) "TOUCHED"
420 V=PEEK(B+RV+SQ):IFV=MTHEN550:REM GET VOCAB FOR SQ/IF NO VOCAB DON'T SPEAK
440 AA=(B+RW+(SQ*16)):FORA=0TO15:REM SET UP PEEK ADR. AND LOOP FOR GETTING DATA
450 AR(A)=PEEK(AA+A):REM GET WORD# & PAUSE FOR AUDIO MESSAGE
460 IFAR(A)=M THEN A=16:REM MEMORY - 255 IF END OF MESSAGE
465 NEXTA:REM GET MORE MESSAGE
470 POKEB5,32:POKE53247,V:SYS52992:REM SW. SPEECH IN, POKE V#, MOVE SPEACH DATA
475 POKEUP,(PEEK(UP)OR2):REM TURN ON TALK RELAY
477 POKEUP,(PEEK(UP)OR2):REM TURN ON TALK RELAY
480 FORA=0TO15 STEP2:REM LOOP FOR SPEAKING
490 W=AR(A):P=AR(A+1):REM ASSIGN DATA TO SIMPLE VARIABLES
500 SPEAK W:REM SAY ONE "WORD"
510 IFP=M THEN A=16:GOTO 530 :REM THRU SPEAKING
520 PAUSE P:REM WAIT HERE FOR P*.25 SECONDS
530 NEXT A:REM LOOP 'TIL DONE
535 POKEUP,(PEEK(UP)AND253):REM TURN TALK RELAY OFF
540 POKEB5,2:REM SWITCH SQUARE DATA IN
550 SC=PEEK(B+SO+SQ):REM GET SPECIAL CODE
555 IFSC<5THENGOSUB3000:GOTO620:REM IF EMERGENCY OR HANGUP THEN SPECIAL SUB-PGM
560 IF SC=M THEN SS=M:GOTO 220:REM START OVER
570 IF SC>200 THEN SC=SC-200:GOTO600:REM ACT ON PREVIOUS SS
575 IF SC>100 THEN SC=SC-100:SS=SC:GOTO 600:REM ACT ON THIS SQUARE NOW
580 SS=SC:GOTO220:REM SET UP BUT DON'T DO ACTION
600 IF SC=M THEN 220: REM FALSE CALL, NO SC SET UP FOR ACTION
610 AC=PEEK(B+AO+SC):PRINT"SC,SS,AC,";SC;SS;AC
620 IF AC AND 128 THEN POKE UP,(PEEK(UP) OR 1):REM PHONE OFF-HOOK
630 IF AC AND 64 THEN POKEUP,(PEEK(UP)OR 4):REM START RECORDER
640 IF AC AND 32 THEN GOSUB 1000:REM DIAL PHONE
650 IF AC AND 16 THEN GOSUB 2000:REM SPEAK SPECIAL MESSAGE
670 IF AC AND 8 THEN POKEUP,(PEEK(UP)AND254):REM PHONE ON-HOOK
680 IF AC AND 4 THEN POKEUP,(PEEK(UP)AND251):REM STOP RECORDER
690 IF AC AND 2 THEN POKEUP,(PEEK(UP)OR8):REM EXTERNAL RELAY ON
700 IF AC AND 1 THEN POKEUP,(PEEK(UP)AND247):REM EXTERNAL RELAY OFF
720 GOTO220:REM START OVER
1000 FORA=0TO24:POKEA+54272,0:NEXTA:REM CLEAR D/A (SOUND) CHIP
1005 POKE54296,15:POKE54277,15:POKE54284,15:REM TURN ON VOLUMES AMD ENVELOPES
1010 POKE UP,(PEEK(UP)OR2):REM TURN ON "TALK" RELAY
1020 AA=(B+PO+(16*SS)):REM COMPUTE ADDRESS OF PHONE # DATA
1030 FORA=0TO15:REM SET UP LOOP FOR "DIALING"
1040 D=PEEK(AA+A):REM GET PHONE DIGIT
1070 IFD>9THENA=16:GOTO1140:REM END OF PHONE #
1090 POKEH1,H(R(D)):POKEL1,L(R(D)):REM SET "ROW" FREQUENCY OF TOUCH TONE
1100 POKEH2,H(C(D)):POKEL2,L(C(D)):REM SET "COLUMN" FREQUENCY OF TOUCH TONE
1110 POKEV1,TW:POKEV2,TW:REM TURN AUDIO ON
1120 PAUSE 1:REM TONE FOR .25 SECONDS
1130 POKEV1,OF:POKEV2,OF:REM STOP TONES
1140 NEXTA:REM LOOP 'TIL LAST DIGIT
1150 POKE UP,(PEEK(UP)AND 253):REM TURN TALK TELAY OFF
1155 POKE54296,0:REM TURN VOLUME OFF
1160 RETURN
2000 V=PEEK(B+SV+SS):IFV=MTHENRETURN:REM GET VOCAB # OF SPECIAL MESSAGE
2010 AA=(B+SW+(16*SS)):REM COMPUTE ADDRESS OF OF SPECIAL MESSAGE DATA
2020 FORA=0TO15:REM SET UP LOOP TO GET SPECIAL WORD & PAUSE DATA
2030 AR(A)=PEEK(AA+A):REM GET DATA
```

```
2040 IFAR(A)=MTHENA=16:REM IF = 255 THEN END OF MESSAGE
2050 NEXTA:REM LOOP 'TIL END REACHED
2055 POKEBS,32:REM SW. SQUARE DATA OUT
2060 POKE53247,V:SYS52992:REM MOVE SPEACH DATA
2065 POKEUP,(PEEK(UP)OR2):REM TURN TALK RELAY ON
2070 FORA=0TO15 STEP2:REM SET UP TO SPEAK MESSAGE
2080 W=AR(A):P=AR(A+1):REM ASSIGN TO SIMPLE VARIABLES
2100 SPEAK W:REM SAY THE WORD!
2120 IFP=M THEN A=16:GOTO2140 :REM END OF MESSAGE REACHED
2130 PAUSE P:REM WAIT P*.25 SECONDS
2140 NEXT A:REM LOOP 'TIL END OF MESSAGE
2145 POKEUP,(PEEK(UP)AND253):REM TURN TALK RELAY OFF
2150 POKEBS,2:REM SWITCH SQUARE DATA IN
2160 RETURN
3000 IFSC=4THEN3300:REM HANGUP
3010 IFSS<>SCTHENEC=0:REM 1ST EMERGENCY CALL
3020 SS=SC:EC=EC+1
3030 ON EC GOTO 3100, 3200
3040 AC=16:RETURN:REM 3RD OR MORE CALL, SPEAK EMERGENCY MESSAGE
3100 AC=0:RETURN:REM NO ACTION ON FIRST CALL
3200 AC=224:RETURN:REM OFF-HOOK/RECORD/DIAL
3300 IF SS<4 AND EC>2 THEN AC=10:SS=255:RETURN:
3310 AC=8:RETURN:REM REGULAR HANGUP
50 THIS M/L PROGRAM TAKES FOUR 8K BANKS OF DATA (AT $8000-$9FFF)
60 AND MOVES IT TO $3200-$B1FF IN RAM
100 CF00 78                   SEI     (STOP INTERRUPTS TO SPEED EXECUTION)
110 CF01 AD FF CF              LDA   $CFFF (GET "NEW" VOCAB #)
112 CF04 CD FE CF              CMP   $CFFE (COMPARE WITH "OLD")
114 CF07 F0 39                 BEQ SAME   (END NOW IF THEY ARE SAME)
116 CF09 8D FE CF              STA   $CFFE (MAKE OLD=NEW)
120 CF0C 0E 60 A1              ASL          (SHIFT VOCAB # LEFT TO POSITION -)
130 CF0F 0A                    ASL  (FOR BANK SELECT REGISTER)
140 CF10 85 57                 STA   $57 (SAVE BSR DATA FOR USE LATER)
150
160 CF12 A2 04                 LDX #$04 (SET UP FOR FOUR 8K MOVES)
170 CF14 A0 00                 LDY #$00 (INITILIZE Y REGISTER -)
180 CF16 84 FE                 STY   $FE (AND MEMORY LOCATIONS -)
190 CF18 84 FC                 STY   $FC (AS LO BYTE "POINTERS")
200 CF1A A9 32                 LDA #$32 (HI BYTE OF "DESTINATION" POINTER)
210 CF1C 85 FF                 STA   $FF (POINTER LOCATION)
220 CF1E A9 80       LOOP1     LDA #$80 (HI BYTE OF SOURCE ADDRESS)
230 CF20 85 FD                 STA   $FD (POINTER LOCATION)
240 CF22 A5 57                 LDA   $57 (GET BSR DATA)
250 CF24 8D FF DF              STA   $DFFF (PUT IN THE REGISTER ON ROM BOARD)
260 CF27 B1 FC       LOOP2     LDA ($FC),Y (GET ONE BYTE)
270 CF29 91 FE                 STA ($FE),Y (STORE ONE BYTE)
280 CF2B C8                    INY         (INCREMENT INDEX FOR NEXT BYTE)
290 CF2C D0 F9                 BNE LOOP2   (GET NEXT BYTE UNLESS 256HAVE BEEN MOVED)
295
300 CF2E E6 FF                 INC   $FF (IF END OF 256 BYTES INCREMENT-)
310 CF30 E6 FD                 INC   $FD (POINTERS TO DO NEXT 256 BYTES)
320 CF32 A9 A0                 LDA #$A0 (GET LAST ADR TO MOVE+1)
330 CF34 C5 FD                 CMP   $FD (TEST TO SEE IF 8K MOVE IS COMPLETE)
340 CF36 D0 EF                 BNE LOOP2 (IF NO COMPLETE THEN MOVE 256 MORE BYTES)
345
350 CF38 E6 57                 INC   $57 (IF 8K DONE INCREASE BSR TO NEXT 8K BLOCK)
360 CF3A CA                    DEX (COUNT DOWN THE 4 8K MOVE LOOPS)
370 CF3B D0 E1                 BNE LOOP1  (IF LESS THAN 4 LOOPS KEEP MOVING)
380 CF3D A9 20                 LDA #$20 (VALUE TO FOR BSR TO SWITCH ROM BOARD OUT)
390 CF3F 8D FF DF              STA   $DFFF (STORE IN BSR)
400 CF42 58          SAME      CLI (ENABLE INTERUPTS)
410 CF43 60                    RTS (RETURN TO BASIC)
SMOVE
= $CF00
```

```
100 8F80 78              SEI         (STOP INTERUPTS TO SPEED EXECUTION)
170 8F81 A0 00           LDY  #$00   (INITILIZE Y REGISTER AS INDEX)
180 8F83 84 FE           STY  $FE    (LOW BYTES OF ADR. POINTERS)
190 8F85 84 FC           STY  $FC
200 8F87 A9 C0           LDA  #$C0   (HI BYTE DESTINATION POINTER)
210 8F89 85 FF           STA  $FF    (HI BYTE POINTER ADR.)
220 8F8B A9 80           LDA  #$80   (HI BYTE SOURCE POINTER)
230 8F8D 85 FD           STA  $FD    (HI BYTE POINTER ADR.)
260 8F8F B1 FC    LOOP1  LDA  ($FC),Y (GET ONE BYTE)
270 8F91 91 FE           STA  ($FE),Y (STORE ONE BYTE)
280 8F93 C8              INY         (INCREMENT INDEX FOR NEXT BYTE)
290 8F94 D0 F9           BNE  LOOP1  (IF < 256 BYTES LOOP)
295
300 8F96 E6 FF           INC  $FF    (IF = 256 BYTES INC-)
310 8F98 E6 FD           INC  $FD    (BOTH HI BYTE POINTERS)
320 8F9A A9 90           LDA  #$90   ($8FFF IS END OF 4K BLK)
330 8F9C C5 FD           CMP  $FD    (CHECK FOR PAST END)
340 8F9E D0 EF           BNE  LOOP1  (IF NOT END THEN LOOP)
345
400 8FA0 58              CLI         (RESTORE INTERUPTS)
410 8FA1 60              RTS         (JOB COMPLETE !)
M/LMOVE
= $8F80
```

Figure 5:
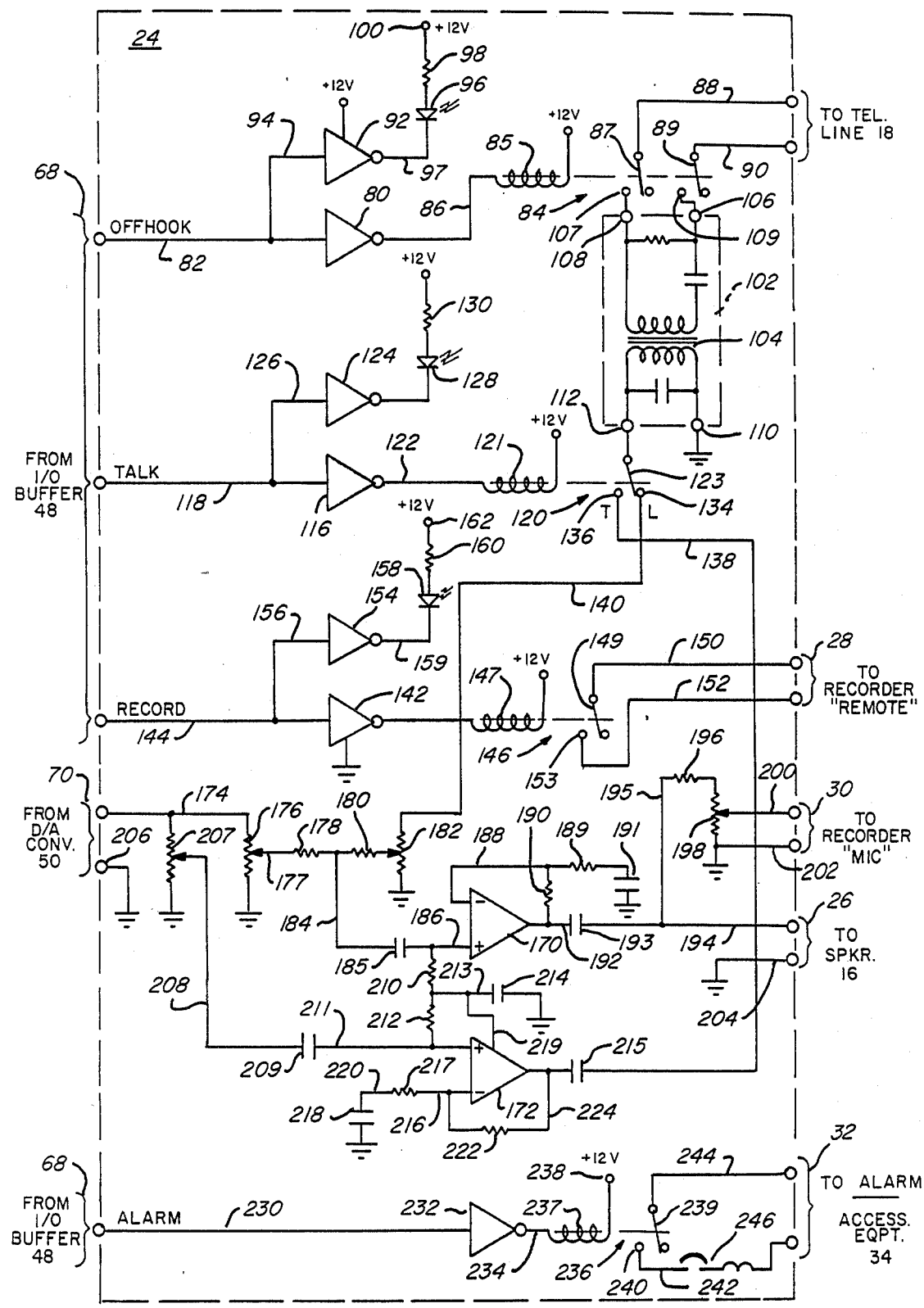
FIG. 5 is a circuit schematic diagram of the interface circuit of the audio/telephone communication system shown in FIG. 2.

Referring now to FIGS. 1, 2 and 5, the operation of interface circuit 24 will be explained in detail. Data from the second input/output buffer circuit 48 is applied through the computer "data" port 47 and cable 68 as inputs to the interface circuit 24 as an "offhook" signal applied in through conductor 82, a "talk" signal applied in through conductor 118, a "record" signal applied in through conductor 144 and an "alarm" signal applied in through conductor 230. The regenerated audio mesages from the D/A converter 50 are applied through the computer "audio" port 51 and cable 70 as an input to the interface circuit 24 on a pair of conductors 174 and 206.

When all of the data inputs from computer 12 are a logic "low" as applied to interface circuit 24 through conductors 28, 118, 144 and 230, the system is in an "off" condition, as will hereinafter explained. With a "low" input applied to the inverting buffer amplifiers 80, 116, 142, and 232, the outputs of the inverting circuits will be a logic "high," thus maintaining relay 84 in its de-energized or "open" condition, maintaining relay 120 in its de-energized or "listen" condition (relay arm 123 in contact with terminal "L" 134), maintaining relay 146 in its de-energized or "open" condition, and maintaining relay 232 in its de-energized or "open" condition.

With relay 84 de-energized, the circuit to telephone line 18 conductors 88 and 90 will be broken. With relay 146 de-energized, the circuit to the audio recorder "remote" control, through conductors 150 and 152, will also be broken, thus disabling the remote recorder 20. With relay 236 de-energized, the 120 VAC circuit to alarm/accessory equipment 34, conductors 244 and 242 and circuit breaker 246, will be opened and prevent energization of the alarm/accessory equipment.

A "low" input on conductors 82, 118 and 144 will also be applied through conductors 94, 126 and 156, respectively, to inverting buffer amplifiers 92, 124 and 154, respectively. The "high" outputs of inverting buffers 92, 124 and 154 are applied to the negative side of LED's 96, 128 and 158, respectively, thus preventing current flow through the LED's. However, any time there is a logic "high" voltage signal appearing on conductors 82, 118 or 144, the outputs of buffers 92, 124 and 154 will be "low," and current will flow through LED's 96, 128 and 158 from +12 vdc sources 100, 132 and 162, respectively, through resistors 98, 130 and 160, respectively. Thus when a "high" logic level signal is applied into interface circuit via conductors 82, 118 and 144, the LED's will conduct and emit visible light, thus indicating the presence of a "high" data input (a control signal) to the interface circuit 24 from computer 12. This indication of a "high" input from computer 12 by the LED's 96, 128 and 158 is for test and trouble-shooting purposes only, and is not visible from the interface circuit to the operator.

When a "high" voltage signal is applied from computer 12 through conductor 82, the output of buffer 80 will go low and energize the coil 85 of the double pole, double throw (DPDT) relay 84, thus connecting telephone line 18 to the telephone isolation circuit 102 through conductor 88, relay arm 87 and relay pin 107, and conductor 90, relay arm 89 and relay pin 109, to terminals 108 and 106, respectively, on the isolation circuit 102. Isolation circuit 102 is a conventional telephone line impedance matching and isolation circuit utilizing a transformer 104 and having output terminals 110 and 112. Any conventional telephone line isolation circuit may be utilized. However, a Radio Shack 43–228 circuit has been found satisfactory. Isolation circuit terminal 110 is connected to ground, and terminal 112 is connected to the relay arm 123 of the relay 120.

If the "talk" data input from computer 12 to interface circuit 24 on conductor 118 is a "low" logic signal as hereinabove described, then relay 120 is de-energized, and any audio message or communication appearing on telephone line 18 from a remote source will be applied through isolation circuit 102 (as hereinabove described) through relay contact 134 in the "L" or "listen" position, and through conductor 140 to one portion of a resistive divider network, resistors 182 and 180, then through conductors 184 and 186 and capacitor 185 to the "+" input of one side 170 of a dual power-amplifier 170, 172. If voltages representative of telephone speech are present on telephone line 18, and are applied to the "+" input of amplifier side 170 as hereinabove described, the output of amplifier 170 will be applied out through conductors 192 and 194 and capacitor 193 to speaker 16 via cable 26. The other connector of cable 26 is connected to ground potential in interface circuit through conductor 204.

A conventional feedback biasing network for amplifier side 170, comprising resistors 189 and 190, capacitor 191 and conductor 188 is connected between ground potential, the output side of amplifier 170 and the "−" input of amplifier side 170. In addition, signals appearing at the output of amplifier side 170 will also be applied through conductor 195 to an impedance matching circuit comprising resistor 196 and variable resistor 198 and conductors 200 (connected to the variable wiper arm of the resistor) and 202, (connected to the other side of resistor 198), as an input to the audio recorder microphone jack via cable 30 for recording the speech message if the recorder has been activated.

If a "high" logic input appears on the "record" line 144 of the interface circuit, the output of inverting buffer 142 will go "low," thus energizing coil 147 of relay 146 and moving relay arm 149 into contact with relay pin 153. The energizing of relay 146 completes the circuit through conductors 150 and 152 to the audio recorder 20 "remote" control jack via cable 28 and energizing the recorder for recording audio signals appearing at the output of amplifier side 170 as hereinabove described.

Audio signals from D/A converter 50 are applied through cable 70 as an input to interface circuit 24 through conductors 174 and 206. Conductor 206 is connected to ground potential, while conductor 174 is connected to one side of a resistive divider network through resistors 176 and 178 and conductors 177 and 184 (as hereinabove described) to amplifier side 170. Audio signals from the D/A converter 50 and amplified by amplifier 170 will be applied as an output of amplifier 170 through conductors 194, 200 and 202 to speaker 16 (through cable 26) and to the recorder 20 "microphone" jack (through cable 30), respectively. The audio input signals applied via conductor 174 are also applied through resistor 207, conductor 208, capacitor 209 and conductor 211 to the "+" input of the other side 172 of the dual power-amplifier 170, 172. The variable resistors 176, 182 and 207 will be preset when the interface circuit 24 is manufactured, and will not be adjustable by the operator.

A feedback biasing network comprising conductor 224, resistor 222, capacitor 218, conductor 220, capacitor 218, conductor 220, resistor 217 and conductor 216 are connected between the output of amplifier 172, ground potential and the "−" input of amplifier side 172. The dual amplifier circuit 170, 172 shares a common input bias network to ground comprising capacitor 214, conductor 213 and a voltage divider network including resistors 210 and 212, connected between conductors 186 and 211, respectively. In addition, a conductor 219 connects the bias pin of amplifier side 172 to conductor 213 of the bias network. The output of amplifier side 172 is applied through capacitor 215 and conductor 138 to the "talk" pin 136 ("T") of the relay 120.

If a "high" logic input appears on the "talk" conductor 118 of the interface circuit, the output of the inverting buffer 116 will go "low," thus energizing coil 121 of relay 120 and switching relay arm 123 into contact with the "T" or "talk" relay terminal 136. With relay 120 "energized," an audio message from D/A converter 50 will be applied through amplifier side 172, conductor 138, the energized relay 120 to isolation circuit terminal 112, and then to the telephone line 18 through conductors 88 and 90, if relay 84 has also been energized as hereinabove described.

As may be understood from the foregoing description of the operation of interface circuit 24, the audio messages from the D/A converter 50 are amplified by amplifier 170 and applied to speaker 16, and may be applied through amplifier 172 to telephone line 18 through relay 120 when the relay switch arm 123 is energized and in contact with the "T" or "talk" pin 136. However, if a "talk" signal is present on line 118, as hereinabove described, and an audio message is routed to the telephone line 18 through relay 120, as soon as the audio message from D/A converter 50 is complete, the signal from computer 12 appearing on line 118 will go "low," de-energizing relay 120 and switching relay switch 123 back to the "listen" ("L") pin 134. This enables the circuit to be ready to receive the next third-party generated speech message over telephone line 18, through relay 120 and conductor 140 as an input to amplifier side 170. The amplified telephone message will then be applied out from amplifier side 170 to the speaker 16 and to the audio recorder 20, if the recorder has been energized as previously described. Thus, interface circuit 24 will receive a series of "high" voltage "talk" signals from computer 12, alternated with a "low" voltage that will energize and de-energize relay 120 to switch between the "talk" and "listen" modes for alternately transmitting the audio messages from the system over the telephone line, and receiving spoken messages from third-parties over the telephone line.

Table III lists and identifies the components shown in the schematic of FIG. 5.

TABLE III

| Reference No. | Component | ID or Value |
|---|---|---|
| 89,92,116, 124,142, 154 & 232 | Inverting Buffers | ULN2003A |
| 84,120,146 | Relays | AROMAT HAI-2 |
| 96,128,158 | LED's | XCZ09R |
| 98 | Resistor | 1.0K |
| 102 | Telephone Isolation Module | Radio Shack 43-228 |
| 130 | Resistor | 1.0K |
| 160 | Resistor | 1.0K |
| 170,172 | Amplifier-Dual Power, 2 Watts | ULN2278 |
| 176 | Variable Resistor | 25K |
| 178 | Resistor | 10K |
| 180 | Resistor | 10K |
| 182 | Variable Resistor | 10K |
| 185 | Capacitor | 0.1 uF |
| 189 | Resistor | 1.8K |
| 190 | Resistor | 100K |
| 191 | Capacitor | 4.7 uF |
| 193 | Capacitor | 470 uF |
| 196 | Resistor | 100K |
| 198 | Variable Resistor | 10K |
| 207 | Variable Resistor | 25K |
| 209 | Capacitor | 0.1 uF |
| 210 | Resistor | 100K |
| 212 | Resistor | 100K |
| 214 | Capacitor | 220 uF |
| 217 | Resistor | 1.8K |
| 218 | Capacitor | 4.7 uF |
| 222 | Resistor | 100K |
| 236 | Relay | Radio Shack 275-218 |
| 246 | Circuit Breaker | 120VAC, 5 amp |

In the following discussion, references to the graphic overlay 14' will be made with reference to FIG. 3 and FIGS. 4A-4F. FIGS. 4A-4F are enlarged fragmentary views of the total graphical overlay shown in FIG. 3, for better understanding the graphic REBUS symbols and any writing appearing on each "square." For ease in identifying and referring to various horizontal rows of "squares" in the overlay 14', the rows are lettered A-O down the left-hand side of each figure 4A-4F. Prior to discussing the overall operation of the system, a description of the graphic overlay 14' will be accomplished, referring primarily to FIGS. 3 and 4A-4F.

Referring now to FIGS. 3 and 4A, the "squares" of the upper left-hand portion of overlay 14' are shown in detail, and contains only message command "squares" 15. In row A, weather related "squares" are shown. For instance, square 15a may have the following message associated therewith: "What is the weather like?," while square 15b may have the following message: "It is windy." Similarly other "squares" of row A may have other phrases or sentences describing the weather. In rows B and C, an array of numbers are shown, which can be used in combination to communicate numbers for dates, time, temperature, money, measurement, etc. For instance, pressing square 15c may get the following message: "sixty" and then touching square 15d would add: "seven" to obtain the number "67." If the "67" was an indication of temperature, then if square 15c is touched, the message may be: "degrees." Similarly, dates can be spoken by combining month squares in Row D with the appropriate numbers of Rows B and C. Row E lists the day of the week and Row F, special occasions and holidays, such as Valentines Day 15f.

Figure 4B:
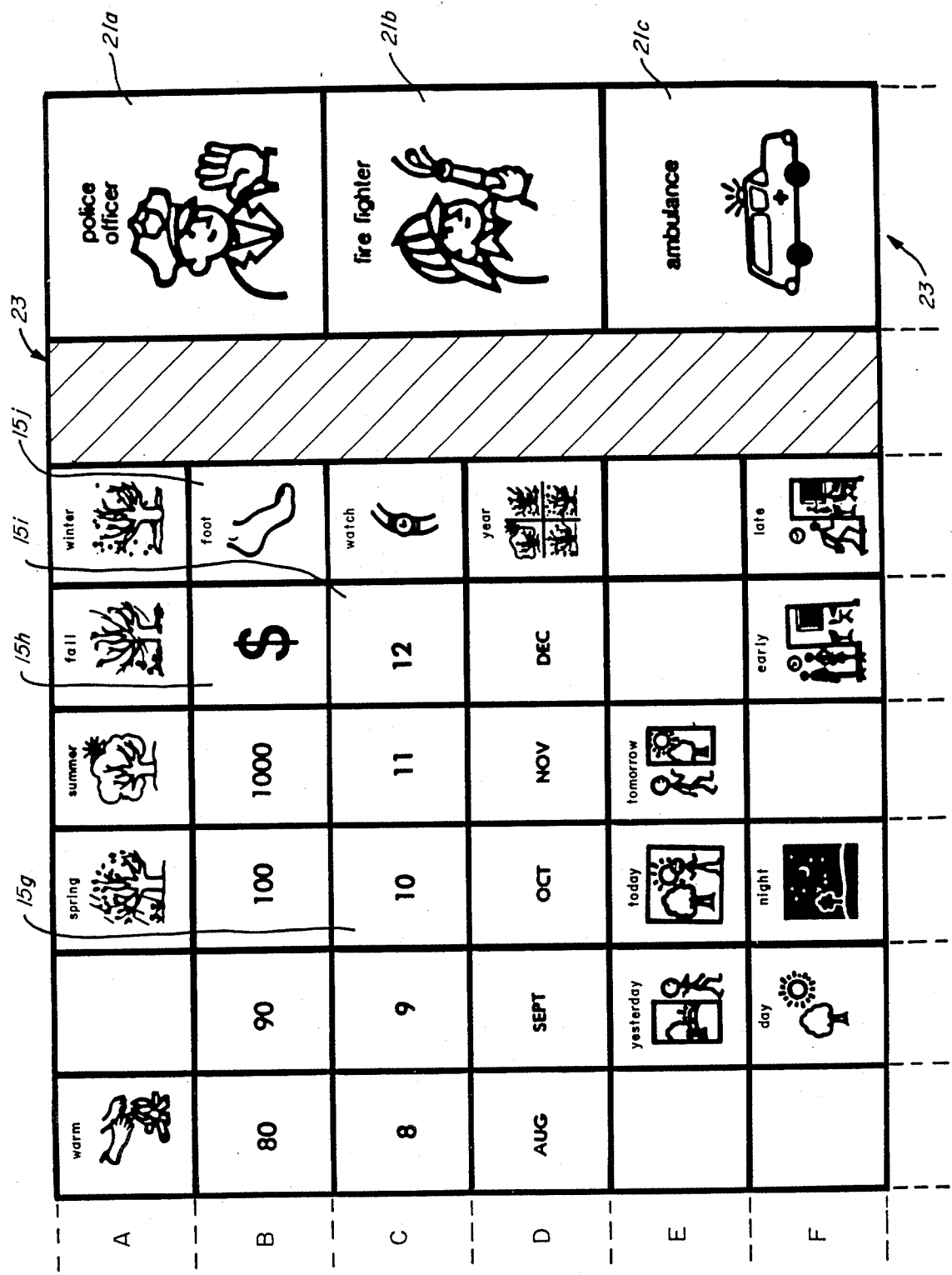
FIG. 4B is an enlarged fragmentary graphical representation of a second portion of the overlay shown in FIG. 3.

FIG. 4B shows in detail the "squares" of the upper right hand portion of overlay 14', and displays both message commands and control commands, separated by a designated "blank" space 23. The "blank" space sets off and separates the "emergency" control commands 21 from the other message commands 15. The message commands of Rows A-F are basically a continuation of the subject matter of Rows A-F shown in FIG. 4A. By touching 15g and 15h in sequence, the following messages would be given: "ten dollars." Similarly, touching 15i and 15j in sequence will give the following message: "twelve foot." The other "squares" for Rows D-F are self-explanatory.

The three "emergency" control command "squares" are in the upper right hand corner and separated from all other squares to reduce the possibility that these squares may accidentally be touched to initiate an emergency call. The "emergency" message squares are oversize, four times the size of a message square 15, for ease of touching by the verbally handicapped person in an emergency situation. The top square 21a is for "Police," the middle square 21b for "Fire" and the bottom square 21c is for an "Ambulance." The emergency control and message squares 21 have a selected audio message. The "Police" square 21a may have a message such as: "This is Joyce Smith. I have an emergency and need a policeman. My address is 1433 61st Street, Anywhere, Tex. 77000." The "Fire" and "Ambulance" squares 21b and 21c, respectively, would have a similar message.

FIG. 4C shows a left hand central portion of the graphic overlay 14'. Row G carries a football symbol and the names of favorite football and baseball teams. Row H carries message squares that deal with human emotions and responses, such as square 15k, which may have the following message: "I love you." Square 15bb would have the message: "No!" Assuming the verbally handicapped individual is a woman and her name is Joyce, square 15m might have the following message: "This is Joyce," and square 15n would have the following message: "My address is 1433 61st Street, Anywhere, Tex. 77000." If Joyce's husband's name is Bill, touching the square 15cc would address him as "Bill." If someone called and asked for Bill, and Joyce answered the telephone, she could respond by touching in sequence squares 15bb, 15cc and 15p which would result in the following message: "No, Bill is at work." Touching square 15q may give the following message: "I need money."

Figure 4D:
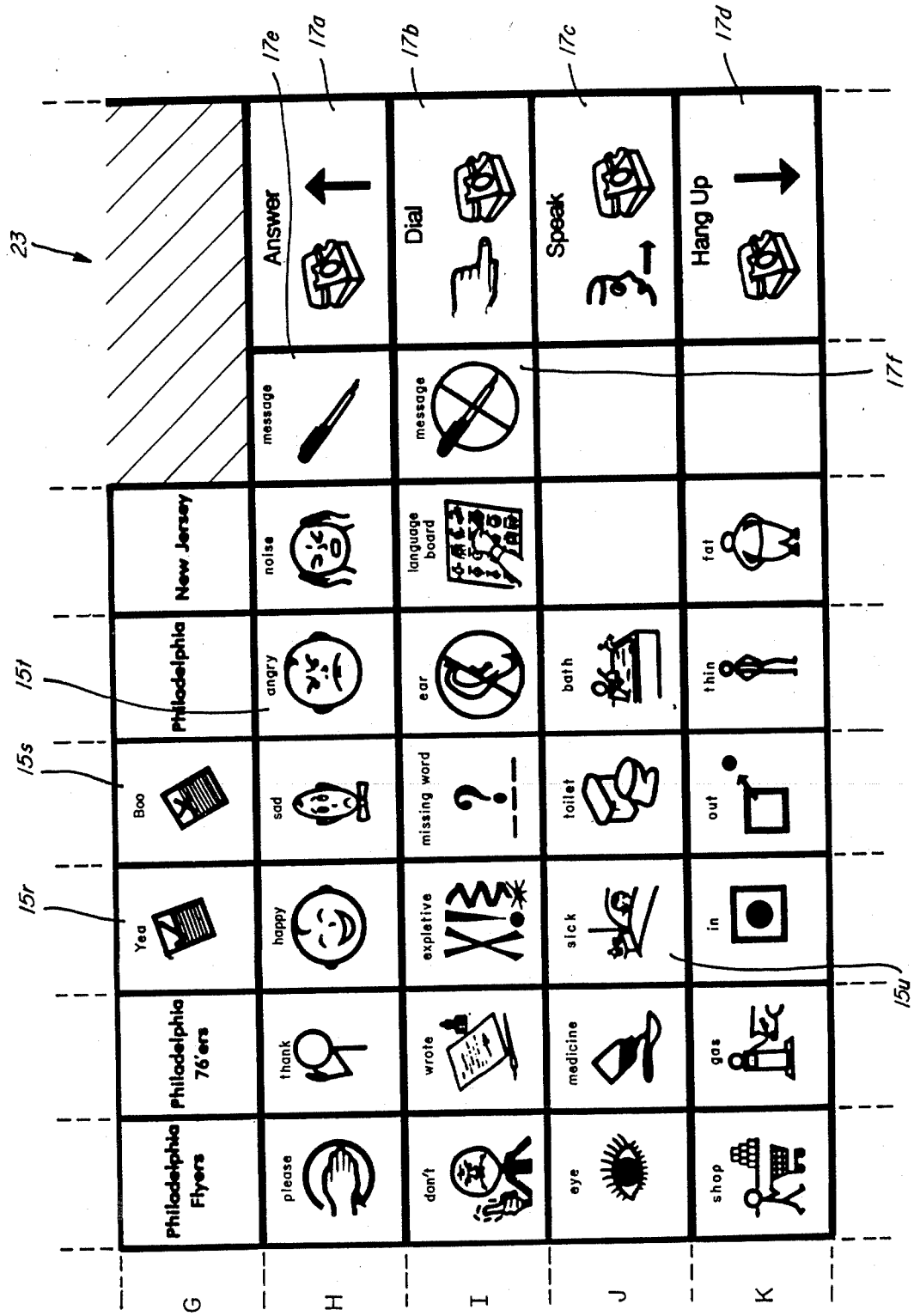
FIG. 4D is an enlarged fragmentary graphical representation of a fourth portion of the overlay shown in FIG. 3.

FIG. 4D illustrates the right hand central portion of the graphic overlay 14'. Row G is a continuation of the sports teams and identified cities. By touching square 15r, the verbally handicapped individual can give a "yea" message in rooting for her (his) team. Similarly, square 15s will give an opportunity to "Boo" the opposing team. Touching square 15t in Row H might provide the following message: "I am very angry." Square 15u, when touched in Row J might provide a message like: "I feel sick."

The right-hand 3 vertical rows, below the blank space 23, carry the six (6) basic control commands for the system. Square 17a when touched provides a control command to the computer to "answer" the telephone with a message like: "Hello, this is Joyce," while square 17b directs the computer to dial a prerecorded telephone number to dial a selected third party. The "speak" square 17c is a special control command given to the computer to initiate a "salutation" message associated with the "special" message squares 19 to be further described. When a telephone conversation is terminated, square 17d is touched, and a control command is given to the computer to "hang up" the telephone and the system will be disconnected from the telephone line. If Joyce wishes to take a message from a caller, she may touch the "message" square 17e and the following message may be given: "May I take a message?" The "message" control command to the computer will cause the audio recorder 20 (see FIG. 2) to be enrgized and record the message. At the end of the conversation, to de-energize or "stop" the audio recorder 20 the square 17f is touched and a control command is given to the computer to shut-off the audio recorder. When "square" 17d is touched, a control command is given to the computer to "hang up" the telephone.

Referring now to FIG. 4E, the lower left hand portion of the graphic overlay 14' is shown containing other symbols representative of selected messages. In Row L, touching the "squares" 15v and 15w in sequence might provide the following message: "David (15v) is in the Navy (15w)." The square 15x in Row O might provide the following message: "has gone to town," and if preceded by a person's name would indicate who had left for town. Touching square 15y might provide the following: "I am watching television." Similarly, in FIG. 4F, touching the square 15z might initiate the following message: "I am eating a sandwich." Touching square 15aa may provide the following: "We are eating dinner."

Figure 4F:
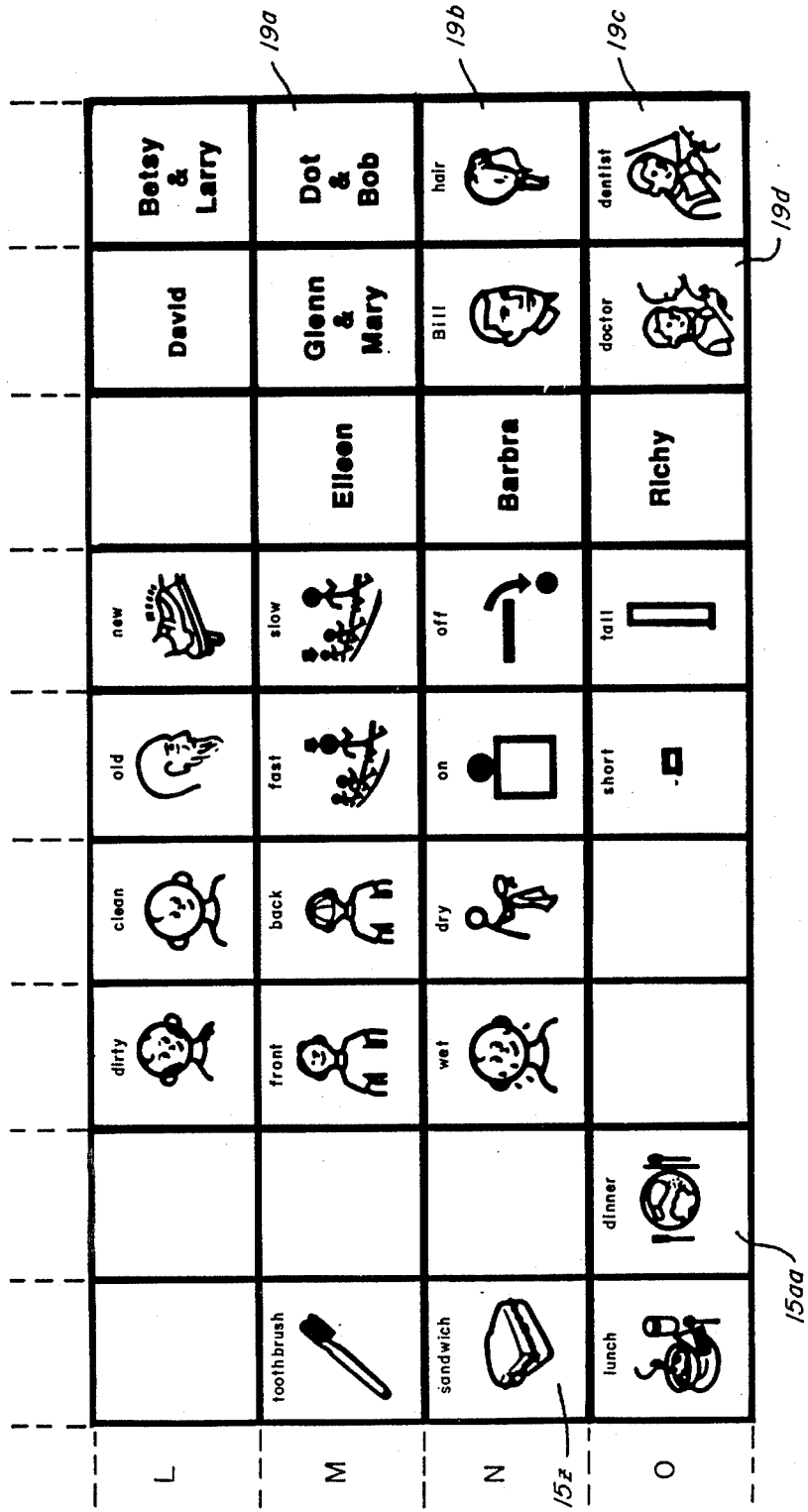
FIG. 4F is an enlarged fragmentary graphical representation of a sixth portion of the overlay shown in FIG. 3.

The "special" message squares 19 are shown in FIG. 4F as occupying the lower right hand corner portion of the graphic overlay 14'. The names and/or symbols of selected individuals are displayed and carry "salutations" and "special messages." If Joyce telephones her friends "Dot and Bob," square 19a is touched and it will give a "special" message or salutation such as "Hello Dot and Bob, this is Joyce. How are you today?" If Joyce wants to make an appointment to have her hair done, the "square" 19b might provide the following message: "Hello Doris, this is Joyce Smith. I need to make an appointment to have my hair done." Similarly, if Joyce needs to make a dental appointment or talk to her dentist, square 19c might provide the following message: "Hello Dr. Solomon, this is Joyce Smith. I need to make an appointment." A similar message can be addressed to the family doctor by touching square 19d.

Only representative and example message command "squares" 15 have been described. It should be apparent that the type of messages (words, phrases and sentences) is variable and will depend on the ability of the verbally handicapped person to think in concepts, words, phrases and sentences. Same may not be able to select words and phrases to compose a sentence, while others may. Therefore, the messages given above as examples are representative only, and it is to be understood that the messages can and will be tailored to the personality and mental capacity of the person using the system.

However, it is expected that many of the "squares" 15 will be of a "standard" nature, such as those in Rows A-F in FIGS. 4A and 4B. Row G (FIGS. 4C and 4D will, of course, be variable. Row H-K will probably be "standard" in the sense that the same symbols are used, but the messages may vary in length and complexity depending on the capabilities of the individual. Rows L-O are more variable and can be tailored for the individual's family and personal circumstances.

Referring now to FIGS. 1-3, 4A-4F and 5, the overall operation of the audio/telephone system 10 will be described. With computer 12 programmed as hereinabove described and the system components interconnected as shown in FIGS. 1 and 2, the system is ready for operation.

Audio Communication Without Telephone

If the handicapped person (operator—"Joyce") wishes to say "I love you," she touches square 15k an overlay 14' (FIG. 4C) and the contact matrix 14 sends a message command to the MPU 40 applied through input/output buffer 46 and Data Bus 62. The MPU will search through the expansion ROM circuit 22 until the appropriate digitized data representative of the selected message is found, and then it is block moved to RAM 44. The digitized data representative of the audio message is shifted from RAM 44 to the D/A converter 50 where the digitized data is regenerated as the audio message in the form of analog audio frequency signals. The audio message signals are applied through "audio" port 51 and cable 70 to the input conductors 174 and 206 of the interface circuit. Since no control command squares 17 have been touched, the MPU 40 will maintain the voltage inputs on conductors 82, 118, 144 and 230 in a "low" state, thus maintaining relays 84, 120, 146 and 236 in a de-energized state, for breaking circuit continuity to telephone line 18, maintaining the relay arm 123 in contact with the relay terminal "L" (134), maintaining the audio recorder 20 and alarm/accessory equipment 34 in de-energized state.

The audio frequency signals applied to interface circuit 24 from the D/A converter 50 will be applied as inputs to both sides of amplifier 170-172, as hereinabove described. The output of amplifier side 170 will be applied out through conductor 194 to speaker 16 via cable 26 and the audio message "I love you" will be broadcast. The output of amplifier side 172 will be applied through conductor 138 to the relay terminal "T" (136). However, since relays 87 and 120 are de-energized, the message is not connected to telephone line 18.

If any other message "squares" 15 are touched, either singly or in sequence as hereinabove described in connection with FIGS. 4A-4F, the computer 12 will respond in a similar manner to shift the digitized data to the D/A converter 50 for regeneration into an audio message for application to interface unit 24 and then to speaker 16.

Answering a Third-Party Originated Telephone Call

If a third-party telephones the Smith residence, Joyce may answer the telephone by touching the "Answer" "square" 17a on the matrix overlay 14'. Touching the "Answer" square causes the input means 14 to send a control command and a message command to the computer MPU 40 as previously described. MPU 40 will determine the address of the data in ROM circuit 22 for access of the appropriate data representative of the "Answer" control command and the digitized data representative of the audio message associated with the "Answer" square ("Hello, this is Joyce") are found. The command and message data are then block moved to RAM 44. The computer will then respond by executing the appropriate response to the command signal by applying "offhook" and "talk" signals ("high" logic level) through the input/output buffer circuit 48, "data" port 47 and cable 68 as inputs to interface circuit 24 on conductor 82 and 118, respectively.

The "high" level "offhook" signal will energize relay 84, thus moving relay contacts 87 and 89 into contact with relay pins 107 and 109 and interconnecting telephone line 18 to the isolation circuit 102 as hereinabove described. The "high" level "talk" signal will energize relay 120 and move the relay contact 123 into contact with the "T" terminal or pin 136. Simultaneously, the digital message data is applied to the D/A converter 50, as hereinabove described, where the digital data is regenerated as an audio message and applied to interface circuit through cable 70. The audio message is applied through conductors 174 and 208 as an input to the amplifier side 172. The amplified output of 172 is applied through conductor 138, relay 120 contacts 136-123, through isolation circuit 102 and relay contacts 87-107 into the telephone line 18 for transmittal over the line to the third party caller. The audio message is also applied through amplifier side 170 to speaker 16 as hereinabove described.

As soon as the audio message has been transmitted over the telephone line 18, MPU 40 will terminate the "high" level "talk" signal and the voltage on conductor 118 in the interface unit will go "low," thus de-energizing relay 120 and permitting the movable switch contact to return to contact with the "L" pin 134 of relay 120, and switching the telephone line 18 into the circuit as an input to amplifier 170 through conductor 140. If the third-party replies with a spoken response, the received speech will be received via telephone line 18 and applied into the interface circuit through conductor 88. The third party speech will then be applied through the closed contacts of relay 84, isolation circuit 102, relay 120 contacts 123 and 134, and conductor 140 as an input to amplifier side 170 as hereinabove described. The amplified output of 170 will be applied to speaker 16 for audible broadcast for Joyce to hear. Joyce can then respond by touching selected message squares 15 of the contact matrix 14, and the MPU 40 will react and handle the message and control commands as hereinabove described.

If the operator desires to take a message, control command square 17e (FIG. 4D) can be touched, and the resultant control command will cause computer 12 to apply "talk" and "record" signals ("high" level) through input/output buffer 48 into the interface circuit 24 on conductors 118 and 144. The "high" level "record" signal will energize relay 146 as hereinabove described, thus closing the circuit to the audio recorder 20 remote power supply and energizing the recorder. The "high" level "talk" signal will energize relay 120 as previously described, thus switching relay 120 to the "talk" or "T" mode with movable contact 123 in contact with pin 136 to receive the output of amplifier 172 through conductor 138.

Simultaneously, the digitized data representing the message "May I take a message?" is applied to D/A converter 50 for regenerating the audio message. The audio message is then applied from D/A converter 50 to the input of interface circuit 24 through conductor 174 as an input to amplifier side 172. The amplified audio message output from amplifier 172 is then applied to the telephone line 18 through the energized relay 120 as hereinabove described.

The telephone conversation between the operator and a third-party will continue in the above manner until the conversation is terminated. If the operator wishes to "turn off" the audio recorder 20, the control square 17f (FIG. 4D) is touched and sends an appropriate control command to computer 12, which in turn terminates the "high" control signal applied to interface circuit 24 through conductor 144. The "low" logic level on conductor 144 will de-energize relay 146, and open contacts 149 and 153 as hereinabove described, thus de-energizing the audio recorder 20. To "hang up" the telephone, the "hang up" square 17d (FIG. 4D) is touched, and the "hang up" control command from the input means 14 to the computer 12 will cause the computer 12 to terminate the "off hook" signal to interface circuit 24. If the voltage on conductor 82 goes "low", relay 84 is de-energized and the telephone line is disconnected as previously described.

Telephone Calls Initiated By the Verbally Handicapped Operator

If the verbally handicapped individual (operator—"Joyce") desires to telephone one of the parties symbolically shown in the "special" control command area 19 (See FIG. 4F), the following sequence of events is initiated. The selected "special" square 19c (the dentist, for example) is touched. The contact matrix 14 sends a control command and a message command to computer 12. As hereinabove described, the computer 12 accesses the stored data representing the message and control commands and block moves the data to the RAM 44. The computer 12 generates "off hook" and "talk" signals (collectively referred to as "phone connect" signals) which are applied to the interface circuit as previously described. The "high" voltage "off hook" and "talk" signals applied to conductors 82 and 118 will energize relays 84 and 120, thereby connecting the system to telephone line 18 and switching the relay contact 123 into the "T" position in contact with pin 136 for receiving the output of amplifier 172 via conductor 138 as previously described.

Next, the "dial" square 17b is touched, and a "dial" control command is applied to computer 12. Computer 12 will access the command data and determines the DTMF data associated with the telephone number applicable to the "square" 19 that has been previously touched. Computer 12 will then apply DTMF data to the D/A converter 50 for generating DTMF signals to be applied to conductor 174 of the interface circuit for application to amplifier 170, 172. The output of amplifier 170 is applied to the speaker 16 and the output of amplifier 172 is applied to the telephone line 18 to dial the desired telephone number. As soon as the telephone number has been dialed, computer 12 terminates the "talk" signal applied to interface circuit 24, thus de-energizing relay 120 and switching the relay contact arm 123 to the "listen" position in contact with pin 134.

The operator awaits an answer by the party called and then touches the "speak" square 17c, which again commands the computer 12 to generate a "talk" or "high" level signal applied to the interface circuit via conductor 118, energizing the relay 120. With relay 120 energized, the output of amplifier 172 can pass through to the telephone line 18. When the "speak" square 17c was touched, the computer 12 also applied the digitized data representative of the audio message to the D/A converter 50, the audio message output of which is then applied as an input to interface circuit 24 via conductor 174 and is applied as an input to amplifier 172. The audio message—"Hello Dr. Solomon. This is Joyce Smith. I need to make an appointment"—is applied out of amplifier 172 and applied through conductor 138 and relay 120 to the telephone line 18. As soon as the message terminates, computer 12 terminates the "high" level "talk" signal sent to the interface circuit 24, thus causing relay 120 to de-energize and switching relay 120 back into the "listen" mode as hereinabove described.

Further conversation can be accomplished between the dentist and the operator by selecting appropriate messages (square 15) to transmit to the dentist as hereinabove described in connection with third-party initiated telephone calls. When the conversation is ended, the operator touches the "hang-up" square 17d and the "off hook" signal is terminated, thus de-energizing relay 84 and disconnecting the interface circuit 24 from the telephone line as previously described in great detail.

The Emergency Commands

If an emergency arises, and the individual may need to call the police, fire department or summon an ambulance for emergency medical assistance, the appropriate emergency control command "square" 21a, 21b, or 21c can be "touched" twice, the first touch sending a message and control command from the contact matrix 14 to computer 12 which then responds by locating the appropriate data corresponding to the messages and downshifting the data to the RAM 44. The second "touch" of the selected emergency "square" will send another phone message and control command to the computer 12, which will send "high" level "phone connect" signals ("off hook" and "talk" signals) to the interface circuit 24 on conductors 82 and 118, respectively, for energizing relays 84 and 120. The presence of the "off hook" and "talk" signals will connect telephone line 18 to isolation circuit 102 and connect the output of amplifier side 172 to the telephone line 18 through relay contacts 123-136 and conductor 138. The DTMF signals to dial the desired telephone number will then be applied to the interface circuit 24 and through the telephone line as hereinabove described.

The operator then pauses to wait for the emergency agency to answer the telephone call and respond, which response will be applied to the interface circuit 24 through telephone line 18, through relay 120 and amplifier 170 to the speaker 16 as hereinabove described in the section dealing with operator originated telephone calls. The operator then touches the selected square 21 a third time, and another control command is applied from contact matrix 14 to the computer 12. The computer, in response to the control command, sends a "high" level "talk" signal to interface circuit 24 to energize relay 120 and also shifts the digitized data representing the audio message to the D/A converter 50 and then the regenerated audio message to interface circuit 24. The audio message informing the emergency agency of the persons name, address and emergency help request is amplified by amplifier side 172 and applied through energized relay 120 to the telephone line 18 for transmission over the telephone line to the emergency agency dispatcher. The message may be repeated by "touching" the selected square again. Of course, a two-way telephone conversation may be initiated, if necessary, between the operator and the emergency agency dispatcher by responding to inquiries with appropriate messages from message square 15 as previously described.

To terminate the call, the operator touches the "hang up" square 17d (FIG. 4D) which sends a control command to computer 12 which in response thereto terminates the "high" level "off hook" signal applied to interface circuit 24. Upon termination of the "off hook" signal, relay 84 is de-energized and the system disconnected from the telephone line as previously described. The control command to computer 12 will also cause the computer to send a "high" voltage "alarm" signal to interface circuit 24 for energizing relay 236 and closing the power 120 VAC circuit to the external alarm and/or accessory equipment 34 through cable 32 (See FIGS. 1 and 2). The alarm accessory may be an audible alarm and/or a flashing external light for alerting neighbors and assisting the emergency personnel responding to the call in finding the address and location of the individual making the call. Of course, other desired accessory equipment may be energized as desired, such as conventional security alarm equipment.

If the operator touches the "Police" square 21a once, and then touches the "Fire" square as the "second" touch, the computer 12 will not respond. The same emergency square (21a or 21b or 21c) must be touched in the one, two, three "touch" sequence to initiate the emergency call. This is necessary to avoid "false" alarms and placing unnecessary or accidental emergency telephone calls to the wrong emergency agency.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

I claim:

1. An operator controlled audio communication system for verbally handicapped individuals that also provides two-way telephone communication over a telephone line, comprising
a programmed computer,
input means interconnected to the computer and symbolically displaying for sensory perception and random selection by the operator each of a plurality of control commands and a plurality of message commands associated with a preselected and prerecorded vocabulary of spoken messages and in response to said operator selection generating data signals identifying the selected message and control commands for application to said computer,
memory means interconnected to said computer and having stored therein preselected command data and digital message data representative of said vocabulary,
digital to analog conversion means interconnected to said computer and responsive to said digital message data retrieved by said computer from said memory means for regenerating in response thereto said selected audio messages and responsive to DTMF data received from said computer for generating signals,
a speaker for broadcasting said regenerated audio messages, and
interface circuit means for establishing direct interconnection between said digital to analog conversion means and said speaker and establishing communication between said computer, said digital to analog conversion means and the telephone line for interconnecting the system to the telephone line and permitting telephone communication thereover by transmitting said generated DTMF signals and regenerated audio messages and receiving third-party generated telephone messages in response to a plurality of computer generated phone connect signals,
said computer being programmed to receive said data signals from said input means and in response thereto interrogating said memory means to locate and retrieve said digital data representative of said vocabulary messages and said command data including telephone numbers stored therein, applying said digital data to said digital to analog conversion means for generating said telephone number DTMF signals and and regenerating selected audio messages, and in response to said data signals representing said selected command data generating a plurality of phone connect signals for application to said interface circuit.

2. The system as described in claim 1, further including audio recording means for recording said regenerated audio messages and third-party generated telephone messages, said interface circuit means in response to a record signal received from said computer energizing said audio recording means for recording said regenerated audio messages and said third-party generated telephone messages, said computer further being programmed to receive data signals from said input means representing said selected control commands and in response thereto generating a "record" signal for application to said interface circuit means.

3. The system as described in claim 1, further including alarm means for controlling the power circuit of auxilliary alarm/accessory equipment in response to a selected control command from said input means, said interface circuit means in response to an alarm signal received from said computer energizing said alarm means, said computer further being programmed to receive data signals from said input means representing said selected control commands and in response thereto generating an alarm signal for application to said interface circuit means.

4. The system as described in claim 1, wherein said memory means comprises a bank-switched expansion ROM circuit.

5. The system as described in claim 1, wherein said input means comprises a matrix of touch-sensitive contacts, and an overlay removably attached to said contact matrix and symbolically displaying for sensory perception and random selection the location of each of said plurality of message commands and control commands.

6. The system as described in claim 5, wherein said overlay graphically displays selected visual symbols and words representing said preselected vocabulary of audio messages and control commands.

7. The system as described in claim 1, wherein said plurality of computer generated phone connect signals comprise an "off hook" signal and a "talk" signal.

8. The system as described in claim 7, wherein said interface circuit means comprises first amplifier circuit means for receiving said regenerated audio messages, amplifying said messages and applying said amplified messages to said speaker, second amplifier circuit means for receiving said regenerated audio messages, amplifying said messages and applying said amplified messages as an output from said second amplifier circuit means, isolation circuit means for isolating the telephone line from said system, first switching means cooperating with said telephone line and said isolation circuit and responsive to an "off hook" signal from said computer for completing the telephone line connection to the telephone line side of said isolation circuit, and second switching means cooperating with the interface circuit side of said isolation circuit and responsive to a "talk" signal from said computer for coupling the amplified regenerated audio messages from said second amplifier circuit means to said interface circuit side of said isolation circuit, said second switch means further responsive to the absence of said "talk" signal from said computer for coupling said interface circuit side of said isolation circuit as a second input to said first amplifier circuit means for amplifying said third-party generated telephone messages.

9. The system as described in claim 8, wherein said first and second amplifier circuit means comprise a dual power-amplifier having first and second amplifier sections, the output of said first amplifier section connected to said speaker and the output of said second amplifier section connected to said second switching means, a first resistor divider circuit coupled to the output of said digital to analog conversion means and interconnected to the inputs of said first and second amplifier sections, a biasing network for each of said first and second amplifier sections, and a second resistor divider network coupled to said second switching means and interconnected to the input of said first amplifier section.

10. The system as described in claim 9, wherein said first switching means comprises a double-pole, double-throw relay the switching contacts of which are interconnected between the telephone line and a first side of said isolation circuit means, the coil of said relay adapted for energizing said relay in response to a low logic level being applied thereto and connecting the telephone line to said first side of said isolation circuit, and an inverter coupled between the output of the computer and said relay coil for inverting the high logic "off hook" signal applied thereto by said computer.

11. The system as described in claim 10, wherein said second switching circuit means comprises a single-pole double-throw relay the switching contacts of which are interconnected between the second side of said isolation circuit means, the output of said second amplifier section and the input to said first amplifier section, the coil of said relay adapted for energizing said relay in response to a low logic level applied thereto and connecting the output of said second amplifier section to said second side of said isolation circuit for transmitting said audio signals over the telephone line, said relay coil being de-energized in response to a high logic level applied thereto and connecting said second side of said isolation circuit to the input of said first amplifier section for receiving third-party telephone messages, and an inverter circuit coupled between the output of the computer and said relay coil for inverting the high logic "talk" signals applied thereto by said computer.

12. The system as described in claim 9, further including audio recording means for recording said regenerated audio messages and third-party generated telephone messages, and wherein said interface circuit means further includes third switching means cooperating with said audio recording means power circuit and responsive to a "record" signal from said computer for energizing said recording means.

13. The system as described in claim 12, wherein said first amplifier section is coupled to the microphone input to said audio recording means, and said third switching means comprises a single-pole single-throw relay the switching contacts of which are interconnected in said audio recording means power circuit, the coil of said relay adopted for energizing said relay in response to a low logic level applied thereto and closing said power circuit to energize said audio recording means, and an inverter circuit coupled between the output of the computer and said relay coil for inverting the high logic "record" signals applied thereto by said computer.

14. The system as described in claim 8, further including alarm means for controlling the power circuit of auxilliary alarm/accessory equipment in response to selected emergency control commands, and wherein said interface circuit means futher includes fourth switching means cooperating with said alarm means power circuit and responsive to an "alarm" signal from said computer for energizing said alarm means.

15. The system as described in claim 14, wherein said fourth switching means comprises a single-pole single-throw relay the switching contacts of which are interconnected in said alarm means power circuit, the coil of said relay adapted for energizing said relay in response to a low logic level applied thereto and closing said power circuit to energize said alarm means, and an inverter circuit coupled between the output of the computer and said relay coil for inverting the high logic "alarm" signals applied thereto by said computer.

* * * * *